(12) United States Patent
Swannell et al.

(10) Patent No.: US 6,464,168 B1
(45) Date of Patent: Oct. 15, 2002

(54) LANDING GEAR

(75) Inventors: Graham Swannell, Banjup (AU); Geoffrey Danes, Sam Rayburn, TX (US); Kim White, North Ryde (AU); Peter Brooks, Hungry Head (AU)

(73) Assignee: Explorer Aircraft, Inc., Jasper, TX (US)

( * ) Notice: Subject to any disclaimer, the term of this patent is extended or adjusted under 35 U.S.C. 154(b) by 0 days.

(21) Appl. No.: 09/882,587

(22) Filed: Jun. 14, 2001

Related U.S. Application Data (60) Provisional application No. 60/211,690, filed on Jun. 14, 2000, and provisional application No. 60/211,944, filed on Jun. 16, 2000.

(51) Int. Cl.⁷ .............................................. B64C 25/12
(52) U.S. Cl. ................. 244/102 A; 244/102 R
(58) Field of Search .................. 244/102 R, 102 A, 244/102 SL (56) References Cited

U.S. PATENT DOCUMENTS

| | | | | | |
|---|---|---|---|---|---|
| 1,523,675 | A | * | 1/1925 | Towle | 244/102 R |
| 2,005,980 | A | * | 6/1935 | Minshall | 244/102 R |
| 2,403,835 | A | * | 7/1946 | Villepigue | 244/102 R |
| 2,478,426 | A | * | 8/1949 | Satre | 244/102 R |

* cited by examiner

Primary Examiner—Robert P. Swiatek
(74) Attorney, Agent, or Firm—Haynes and Boone, LLP (57) ABSTRACT

A landing gear system for an aircraft comprising a pair of legs, each having a wheel at a distal end, a pivot point associated with each leg for allowing each leg to follow an arc-shaped path between a deployed position and a retracted position, one of the legs passing in front of the other while moving from the deployed position to the retracted position, and a linking assembly disposed between the legs for ensuring that the legs move from the deployed position to the retracted position in unison.

19 Claims, 13 Drawing Sheets

LANDING GEAR

CROSS REFERENCE

This application claims the benefit of the U.S. Provisional applications Ser. No. 60/211,690 filed on Jun. 14, 2000 and Ser. No. 60/211,944 filed Jun. 16, 2000.

BACKGROUND

This invention relates to an improved retractable landing gear system for an aircraft.

Many aircraft are equipped with retractable landing gear to improve aerodynamics during flight. Such landing gear moves between a deployed (landing) position and a retracted (flying) position. As the landing gear is retracted and deployed during flight, it is important to create as little drag as possible.

However, previous retractable landing gear systems have several disadvantages. First, most landing gear is moved in a manner that presents an increased surface area of the landing gear to the airflow during retraction and deployment, thus undesirably increasing drag. Second, most landing gear is retracted into the fuselage or wing of the aircraft. This configuration can create structural problems that have to be addressed, and also complicates manufacture. Moreover, retaining the landing gear in the fuselage or wing limits the range of tire sizes that may be used, and takes up valuable space in the cargo or passenger areas of the aircraft.

Therefore, what is needed is a retractable landing gear system that does not take up space inside the aircraft, and reduces drag during retraction and deployment.

DETAILED DESCRIPTION

Figure 1A:
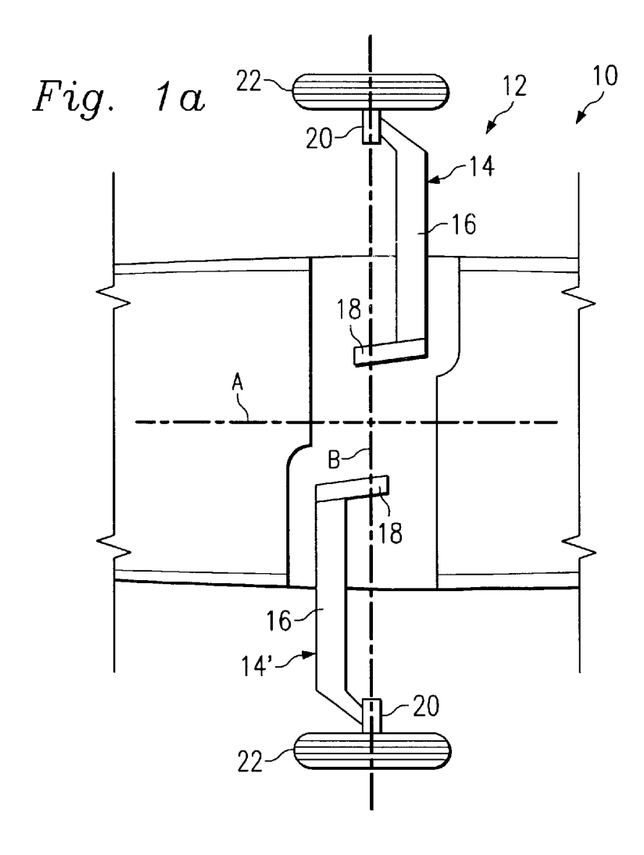
FIGS. 1a–b are bottom diagrammatic views of an aircraft having landing gear according to one embodiment of the present invention.
Figure 1B:
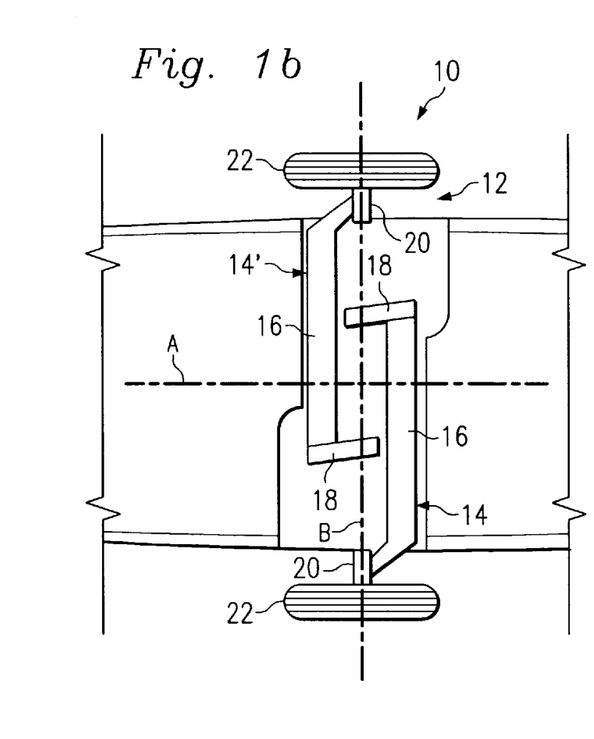
Figure 2:
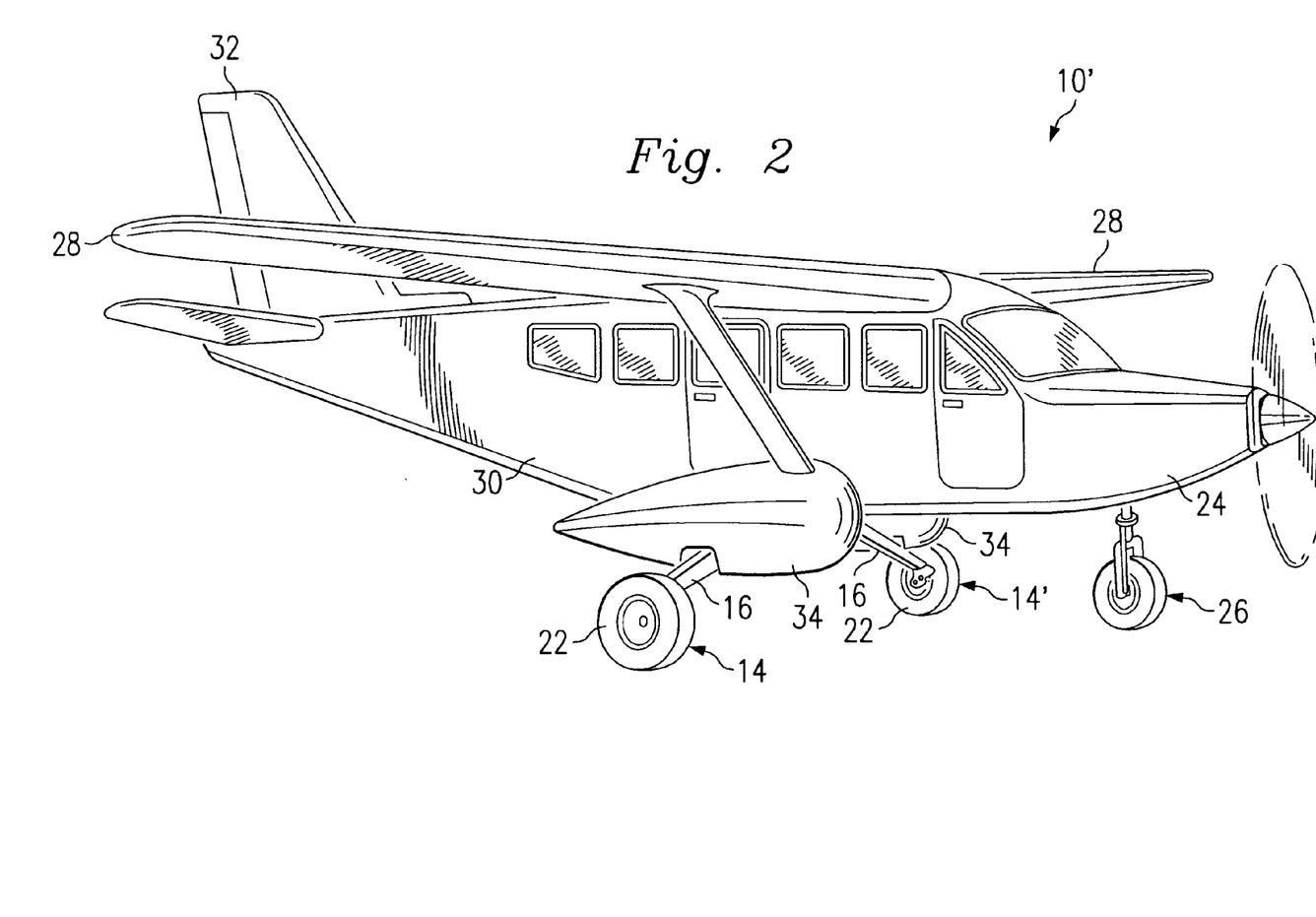
FIG. 2 is a perspective view of an airplane with the landing gear in the deployed position.
Figure 3A:
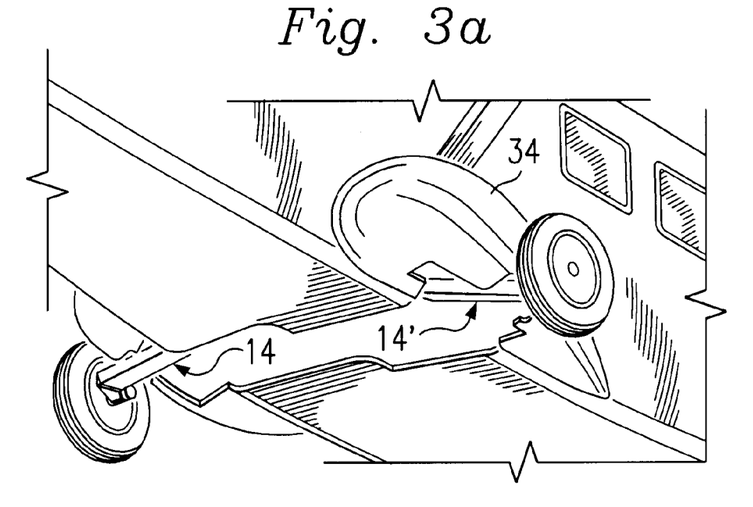
FIGS. 3a–e are perspective views of the airplane with the landing gear in a series of intermediate positions moving between the deployed position to the retracted position.
Figure 3B:
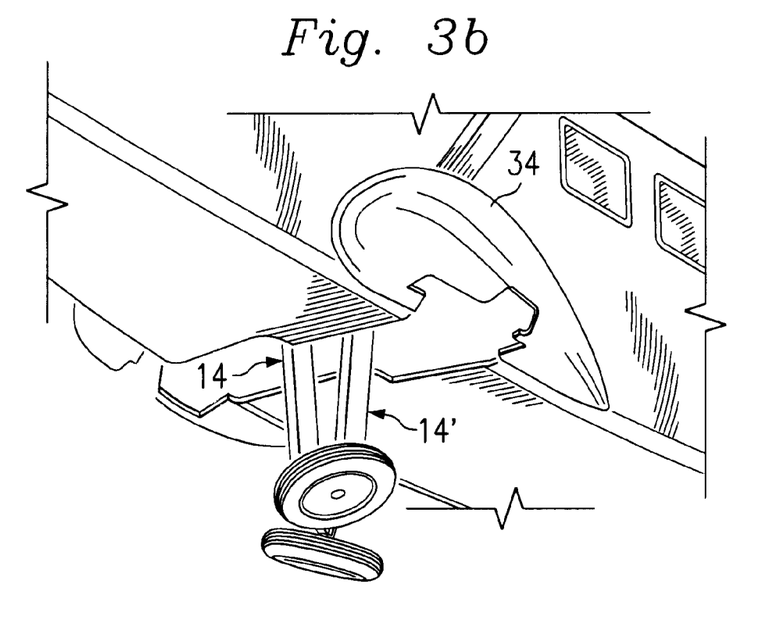
Figure 3C:
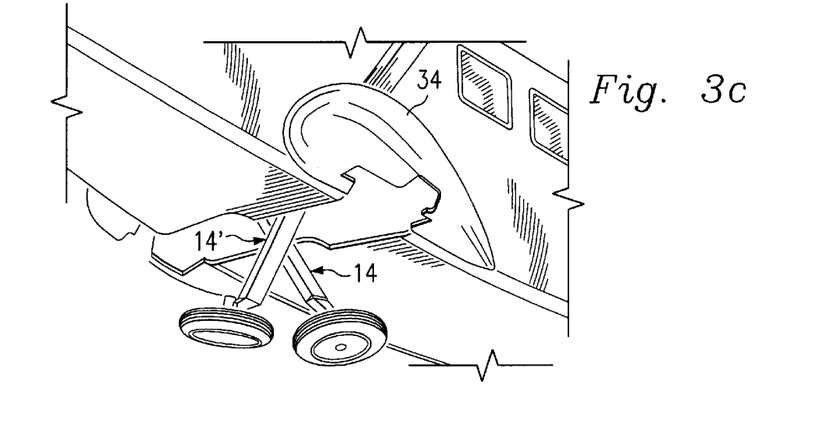
Figure 3D:
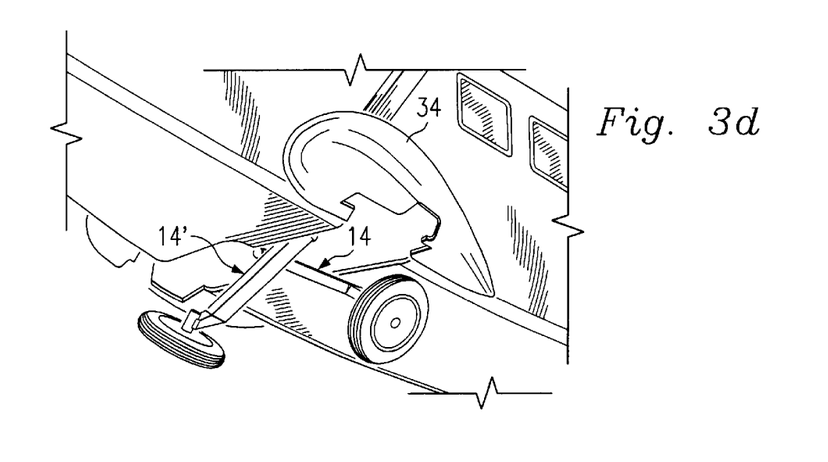
Figure 3E:
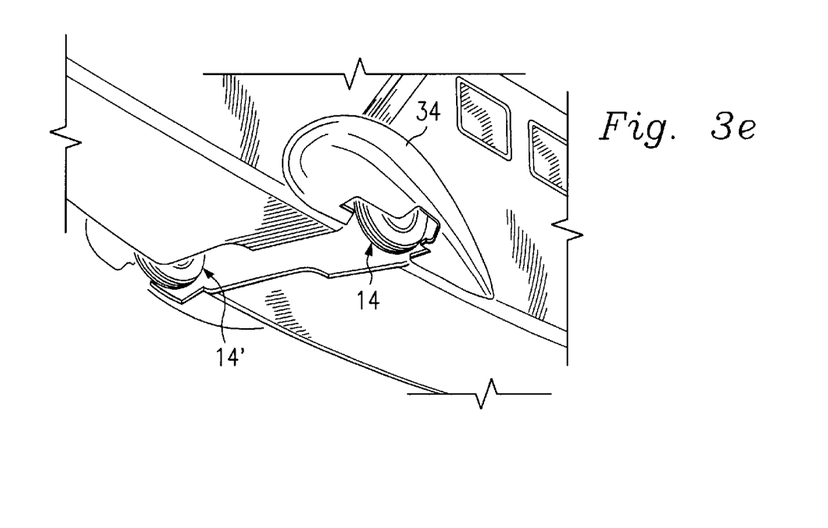

FIGS. 1a–b shows an aircraft 10 equipped with retractable landing gear 12 of the present embodiment. The aircraft 10 may be an airplane, or a helicopter, or other aircraft requiring retractable landing gear. The retractable landing gear 12 is illustrated in the deployed position in FIG. 1a and the retracted position in FIG. 1b.

Turning to FIG. 1a, the retractable landing gear 12 comprises a pair of leg assemblies 14 and 14'. For purposes of this specification, only one leg assembly will be discussed, and the same component reference numbers used, as the leg assemblies 14 and 14' are identical. This is advantageous, as most conventional landing gear is composed of right-handed and left-handed legs, which complicates manufacture.

The leg assembly 14 comprises a leg 16, attached to the aircraft 10 at a pivot point 18. An axle 20 is located at the distal end of the leg 16. The axle 20 is associated with a wheel 22. It is understood that the wheel 22 may be replaced by a ski, float, or other ground contact member for support during landing and takeoff of the aircraft 10.

An axis of symmetry, denoted by the reference numeral A, runs down the longitudinal axis of the aircraft 10. In flight, the axis A is normally substantially aligned with airflow. A second axis of symmetry, denoted by the reference numeral B, runs transverse to axis A, and through the retractable landing gear 12. Although the leg assemblies 14 and 14' are oriented offset or antisymmetrical with respect to each other as a whole, the axles 20, and therefore the wheels 22, are aligned with axis B, and therefore with each other.

Turning to FIG. 1b, the leg assemblies 14 and 14' pass by each other during retraction, as will be explained in greater detail with reference to the subsequent Figures. Thus, when in the retracted position, the wheel 22 associated with leg assembly 14 is on the opposite side of the aircraft 10 as compared to its deployed position (FIG. 1a).

Referring now to FIGS. 2, 3a–e, and 4, an airplane, given the reference numeral 10', is equipped with the retractable landing gear 12. The retractable landing gear 12 is illustrated in the deployed position in FIG. 2. The airplane 10' has many conventional features, including a nose 24, a nose wheel 26, a wing 28, a fuselage 30, and a tail 32.

A pair of pods 34 according to the present embodiment are attached to the fuselage 30. As will be explained, when the retractable landing gear 12 is in the retracted position, each pod 34 receives the wheel 22 of the leg assemblies 14 or 14' disposed opposite the pod. For example, with reference to FIG. 2, in the retracted position, the near pod 34 receives the far wheel 22 (from leg assembly 14'), and far pod 34 receives the near wheel (from leg assembly 14). It is understood that the width of the pod 34 is a function of the size of the wheel 22, and thus the present embodiment could allow use of a vast range of wheel sizes (including widths) by providing pods of appropriate dimensions.

To accomplish retraction from the deployed position (FIG. 2), the leg 16 moves on the pivot point 18 through a series of intermediate positions (FIGS. 3a–e). Drag does not appreciably increase from the deployed position (FIG. 2) to the intermediate positions (FIGS. 3a–e), as the wheels 22 remain substantially parallel to the airflow.

As can be seen from FIGS. 3a–e, the leg assemblies 14 and 14' pass by each other during retraction. To avoid contact between the wheels 22, the leg assemblies 14 and 14' each move in an arc relative to axis B (FIGS. 1a–b). The radius of the arc required is dependent upon the radius of the wheel 22 used, as the wheels of the leg assemblies 14 and 14' must pass each other at the midpoint of the intermediate position.

Figure 4:
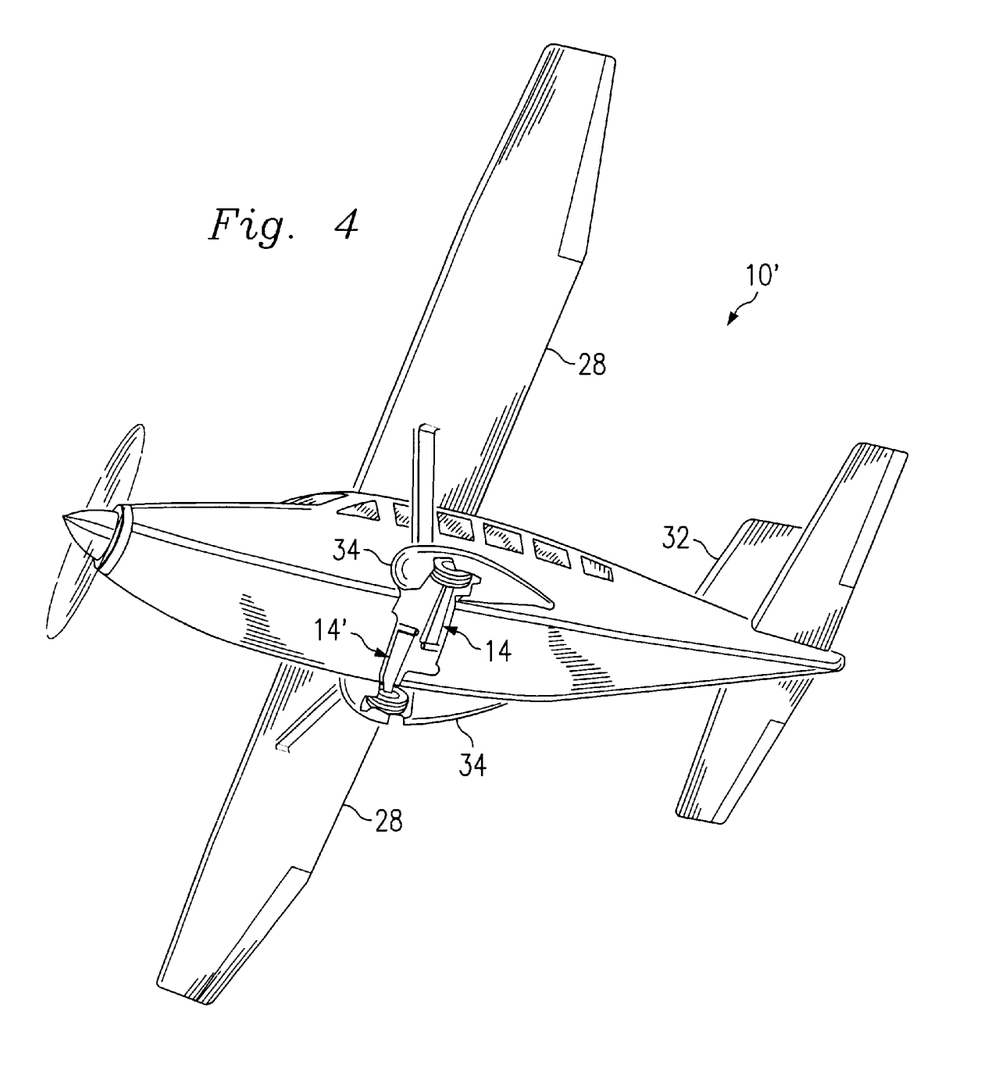
FIG. 4 is a bottom perspective view of the airplane having the landing gear in the retracted position.

Finally, the leg assemblies 14 and 14' reach the retracted position (FIG. 4). This position is aerodynamically favorable, but unlike conventional retractable landing gear, the retractable landing gear 12 of the present embodiment will support the fuselage 30 of the airplane 10' in the event of an emergency landing.

One advantage of the present invention is that no landing gear doors are required, thus simplifying manufacture and preventing icing of the gear doors from becoming a safety factor. In one embodiment, the legs 16 are tapered in cross section, and thus more aerodynamic. Moreover, in this embodiment, the thinner cross section is rotated to allow a smaller aperture in the pod 34 for receiving the leg.

Figure 5:
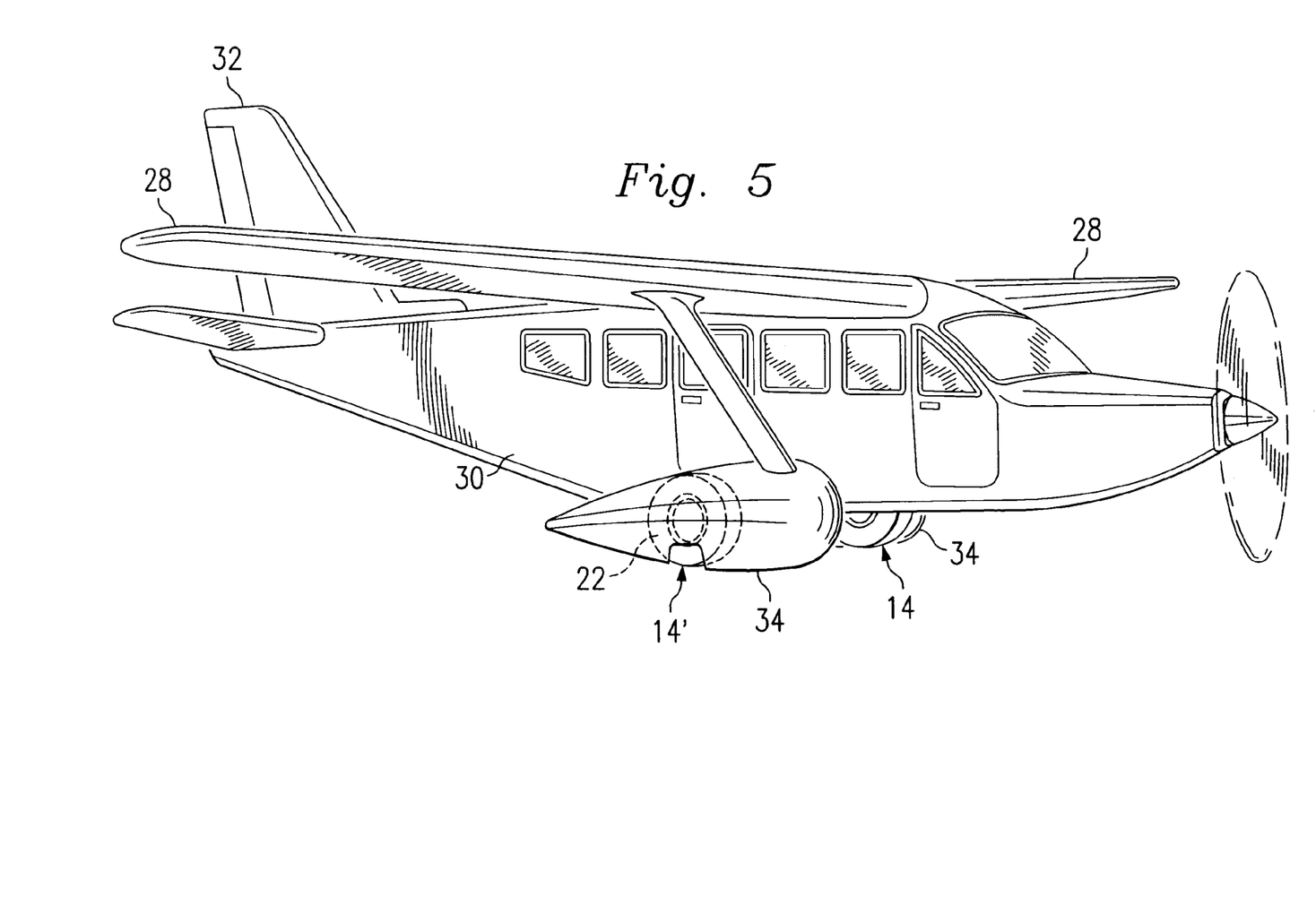
FIG. 5 is a side view of the airplane having the landing gear in the retracted position.

Referring to FIG. 5, the wheels 22 project below the fuselage 30. Thus, while the pods 34 may be damaged or destroyed during an emergency landing, landing with the landing gear in a retracted position can occur without significant damage to the fuselage 30 proper, as the wheels prevent the fuselage from making prolonged contact with the runway.

Figure 6:
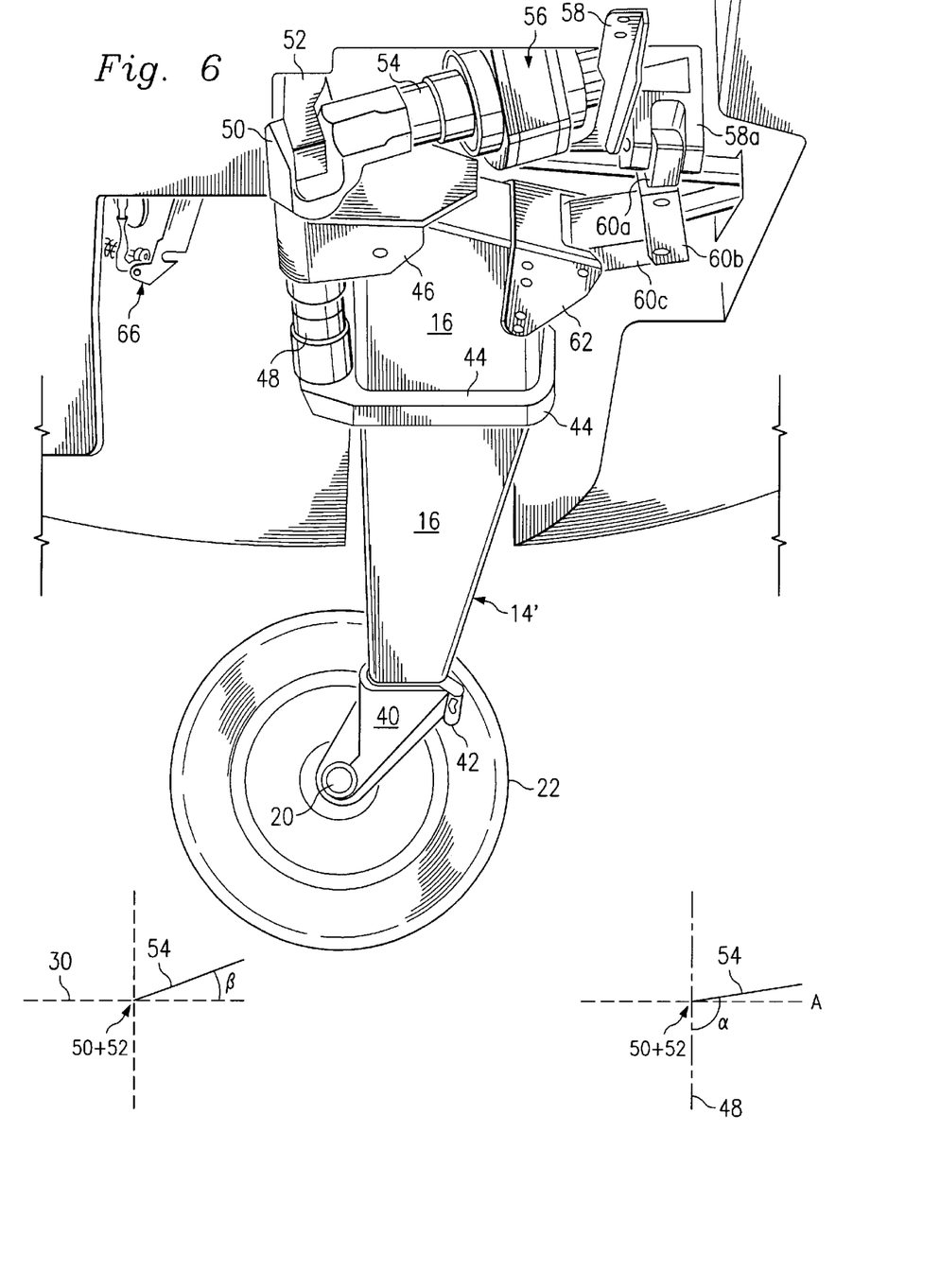
FIG. 6 is a broken away bottom perspective view of a leg of the landing gear shown in the deployed position.
Figure 7:
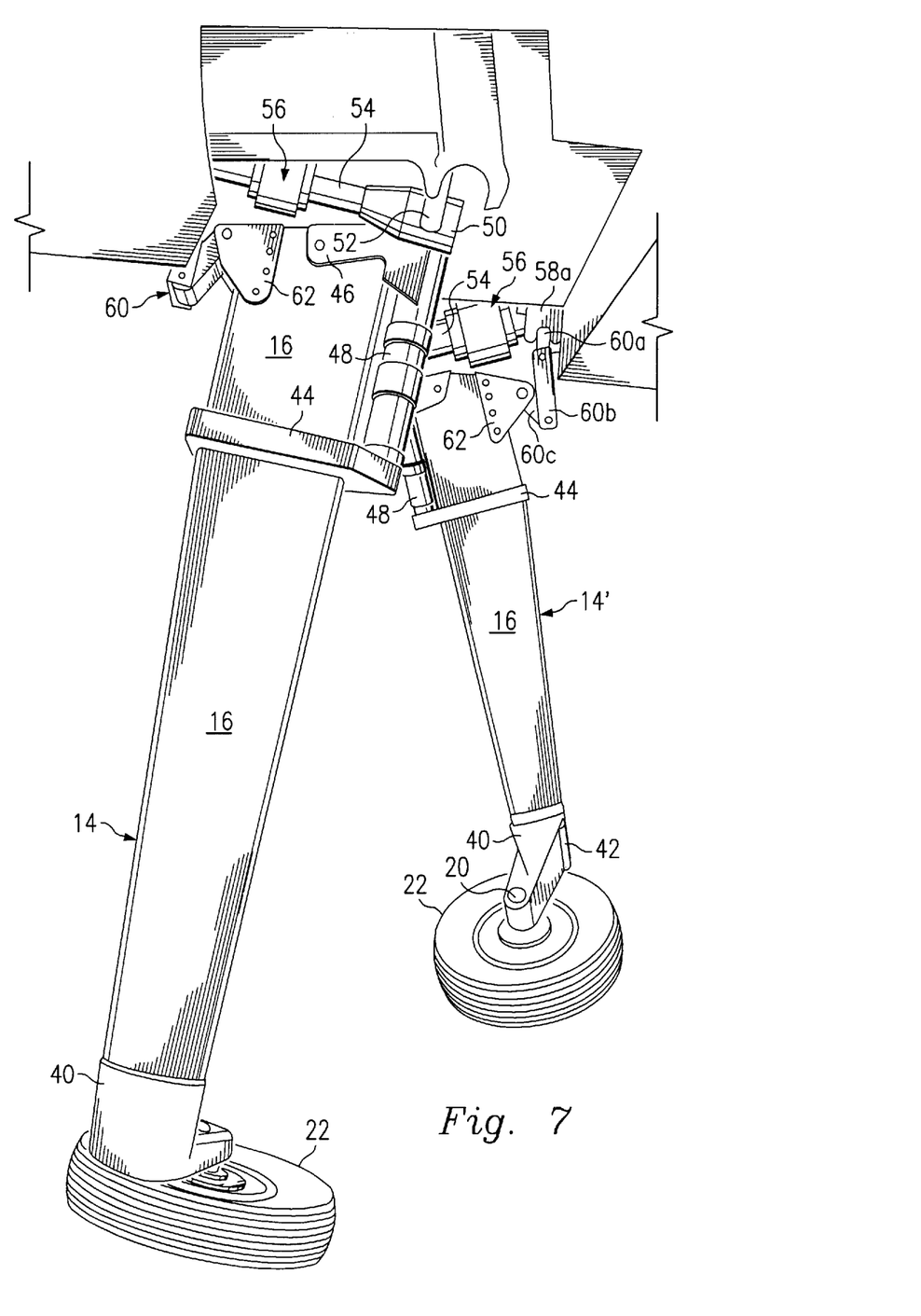
FIG. 7 is a perspective view of the legs of the landing gear in an intermediate position between the deployed and retraction positions.
Figure 8:
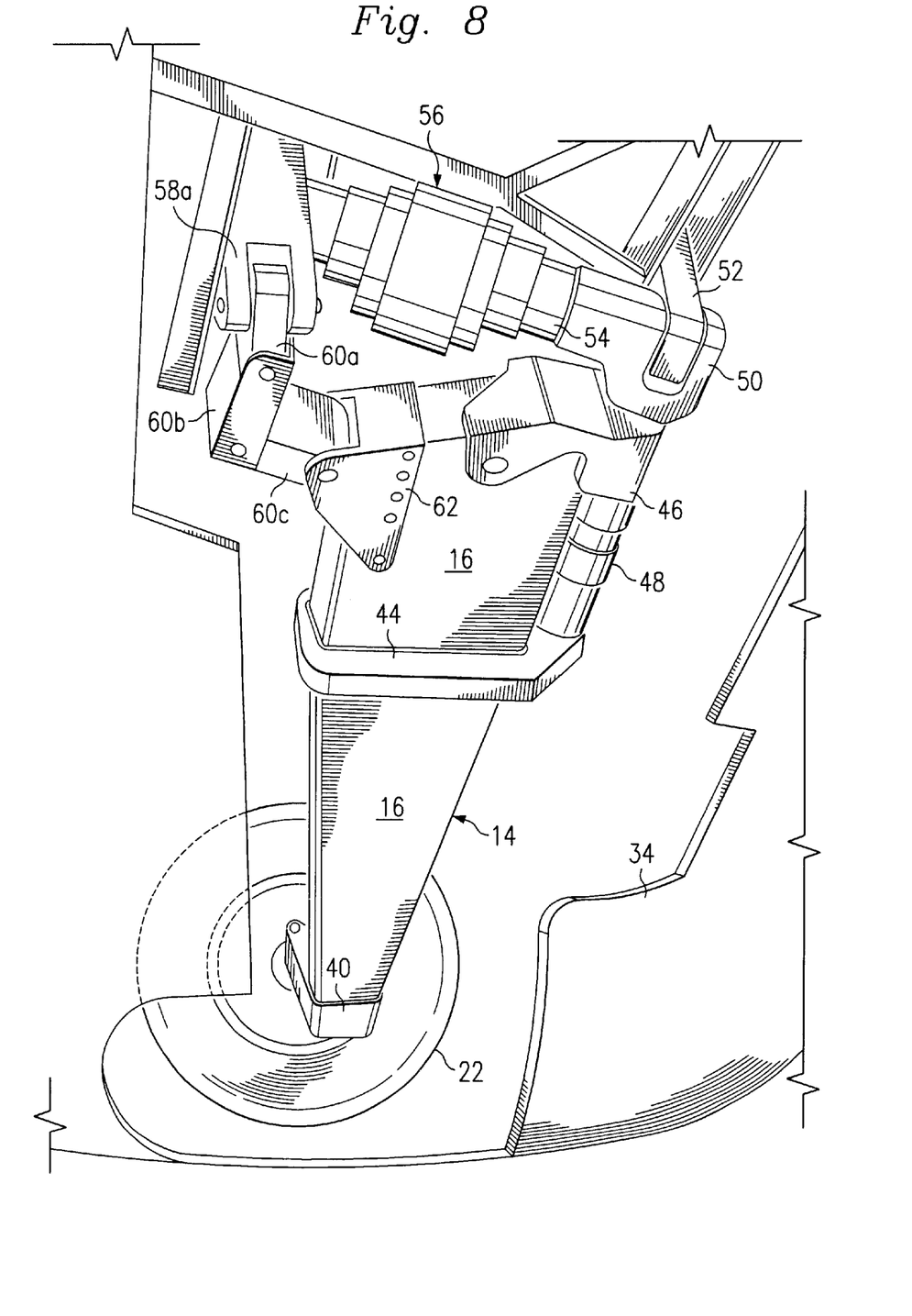
FIG. 8 is a broken away bottom perspective view of the leg of the landing gear shown in the retracted position.

Referring now to FIGS. 6, 7 and 8, one embodiment of the retractable landing gear 12 is shown. Beginning with the wheel 22, a wheel mounting 40 supports the wheel and axle 20. The wheel mounting 40 is connected to one end of the leg 16. It is understood that for simplicity of illustration, conventional landing gear components such as bearings, brakes, and other ancillary components are not depicted.

The wheel mounting 40 has an associated uplock roller 42, which will be discussed in greater detail with reference to FIG. 13.

The other end of the leg 16 is connected to the airplane 10' via the pivot point 18. In this embodiment, the pivot point 18 is formed by a group of components, as will be discussed.

A first bracket 44 surrounds the leg 16. A second bracket 46 is disposed at the end of the leg 16, and a first pivot member 48 extends between the first bracket 44 and the second bracket 46. The pivot member 48 terminates in a U-shaped fitting 50, which receives an extrusion 52 of the fuselage 30, thus pivotally connecting the leg 16 to the airplane 10'. In one embodiment, the extrusion 52 is part of a billet that runs across the airplane 10'.

A second pivot member 54 is received in a side of the fitting 50, and passes through a rack and pinion assembly 56 to be received by a first knuckle bracket 58. The second pivot member 54 allows rotation of the leg 16 to be driven via the rack and pinion assembly 56. In an alternative embodiment, the first pivot member 48, the fitting 50, and the second pivot member 54 may be replaced by one integral piece. Although a number of angles are contemplated between the first pivot member 48 and the second pivot member 54, in one embodiment, an angle α is approximately ninety seven and a half degrees along a plane defined by the leg 16.

Similarly, in one embodiment, an angle β between the second pivot member 54 and a horizontal plane, such as defined by the fuselage 30, is approximately twenty five degrees. Together, these angles α and β cooperate to define the arc traveled by the leg assemblies 14 and 14' relative to axis B (FIGS. 1a–b). It can be appreciated that while angle β is the same for both of the leg assemblies 14 and 14', upon installation in the airplane 10', the arcs of the respective leg assemblies 14 and 14' will be mirror images of each other.

The first knuckle bracket 58 has a U-shaped end 58a for receiving a knuckle assembly 60. The knuckle assembly 60 comprises a sequence of three pivotally connected intermediate members 60a–c. A second knuckle bracket 62 is disposed on the leg 16, and connects to the knuckle member 60c. As the second pivot member 54 is positioned at an angle to the horizontal and the chosen plane of rotation of the leg 16, the knuckle assembly 60 acts to translate the rotation about the second pivot member. As the leg 16 moves in its arc, the knuckle assembly 60 expands, contracts, and expands again to prevent binding.

An uplock assembly 66 is disposed adjacent to the landing gear, as will be discussed with reference to FIG. 13. In summary, the uplock assembly 66 captures the uplock roller 42 of the opposite leg assembly 14 to retain the leg in the retracted position.

In one embodiment, the present invention allows the use of a spring leg (not depicted) to absorb the primary landing loads. This type of landing gear is also lighter than other types of landing gear that incorporate pneumatic (shock-absorber type) hardware.

Turning to FIG. 7, the leg assemblies 14 and 14' are shown in one of the intermediate positions. This intermediate position is characterized by rotation along the second pivot member 54. The knuckle assembly 60 contracts to allow rotation, while still connecting the leg 16 to the airplane 10'. The legs 16 stay apart as a result of the arcs they travel, and are able to pivot about the first pivot member 48, which ensures that the legs may be maintained in the most aerodynamically efficient position.

Turning to FIG. 8, the leg assembly 14 is shown in the retracted position, with the leg assembly 14' and the uplock assembly 66 removed to simplify the Figure. The knuckle assembly 60 expands to accommodate the leg's 16 position, flat against the fuselage 30. Also, the wheel 22 is drawn up into the pod 34, creating minimal drag.

Figure 9:
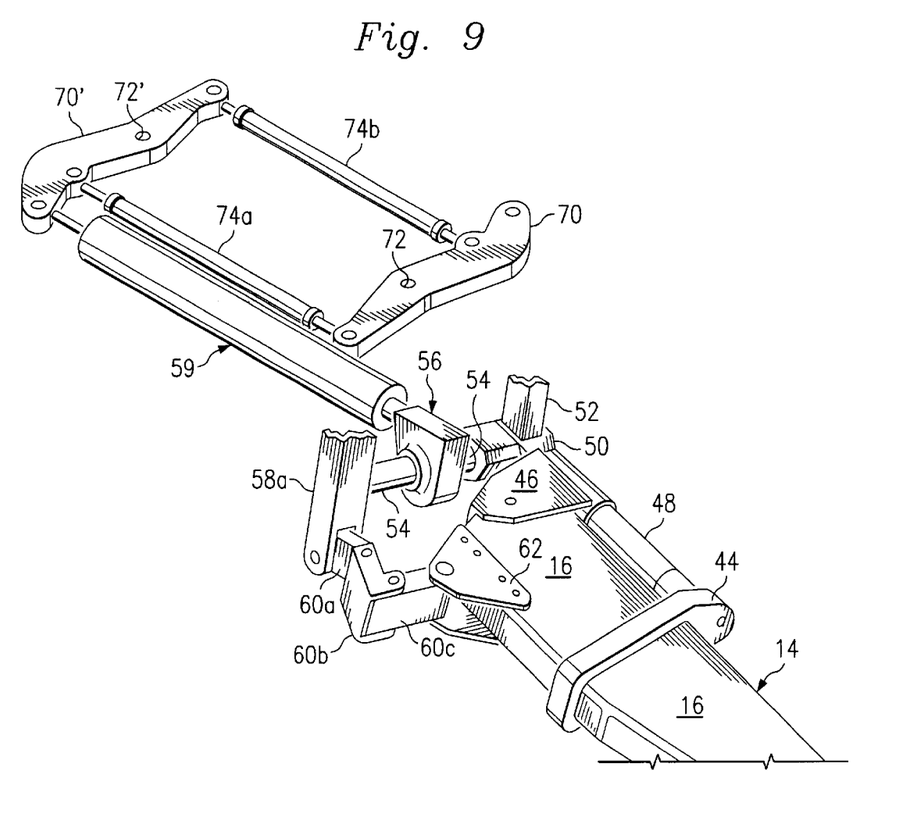
FIG. 9 is a broken away top perspective view of the landing gear with the airplane removed.
Figure 10:
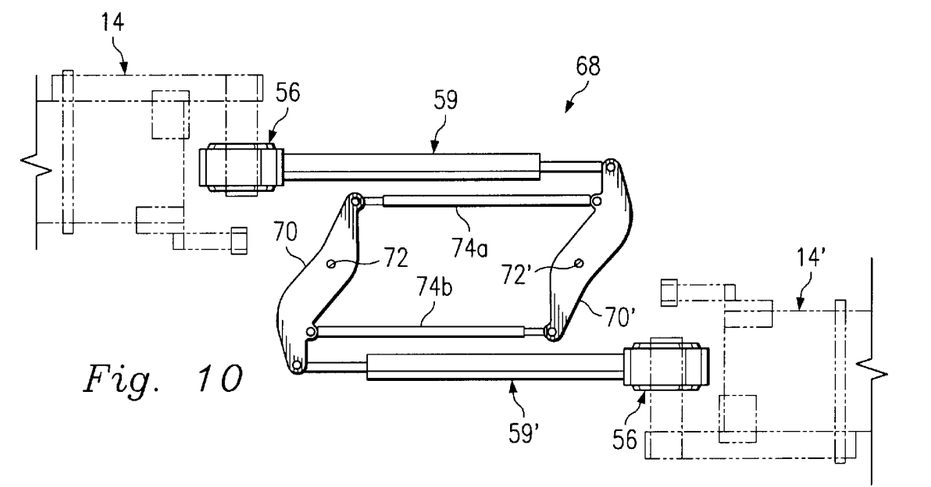
FIG. 10 is a plan view of the linking assembly in the deployed position.
Figure 11:
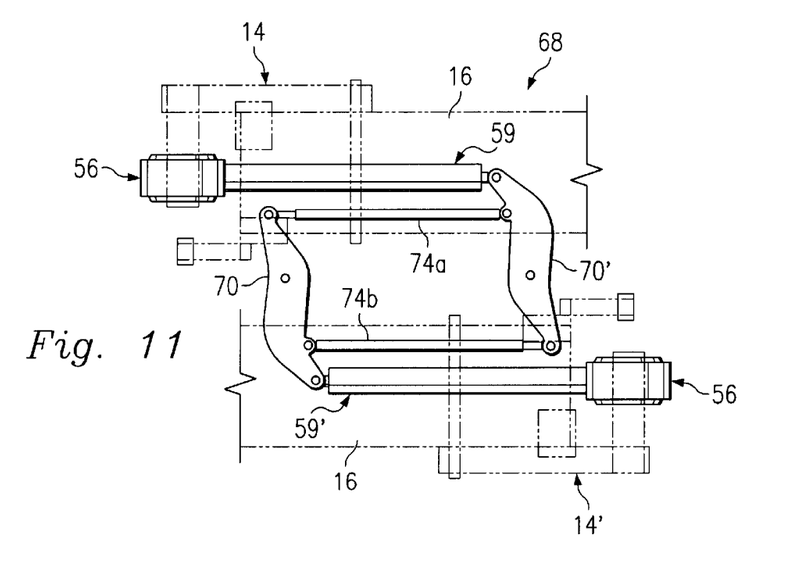
FIG. 11 is a plan view of the linking assembly in the retracted position.

Referring now to FIGS. 9, 10, and 11, the rack and pinion assembly 56 of each leg 16 is actuated by a ram 59 to produce rotation of the leg 16. Turning to FIG. 9, the ram 59 is connected to a linking assembly 68, which is shaped substantially like a parallelogram. Although removed to simplify the Figure, it is understood that a second ram 59'(FIG. 10 and FIG. 11) is connected between the linking assembly 68 and the leg assembly 14 (not depicted). The linking assembly 68 is disposed between the leg assemblies 14 and 14' to ensure that the legs 16 move in unison. This unison movement during retraction and deployment balances the drag experienced by the airplane 10'.

The linking assembly 68 comprises a first pivot arm 70, the first pivot arm turning on a pivot point 72 attached to the fuselage 30. A pair of guide arms 74a–b are attached to the first pivot arm 70, connecting the first pivot arm to a second pivot arm 70'. The second pivot arm 70' turns on a pivot point 72' attached to the fuselage 30.

Turning to FIG. 10, the linking assembly 68 is shown in the deployed position (e.g., FIG. 6). In this position, the rams 59 and 59' are relatively extended. Turning to FIG. 11, the linking assembly 68 is shown in the retracted position (e.g., FIG. 8). In this position, the rams 59 and 59' are relatively contracted.

Figure 12:
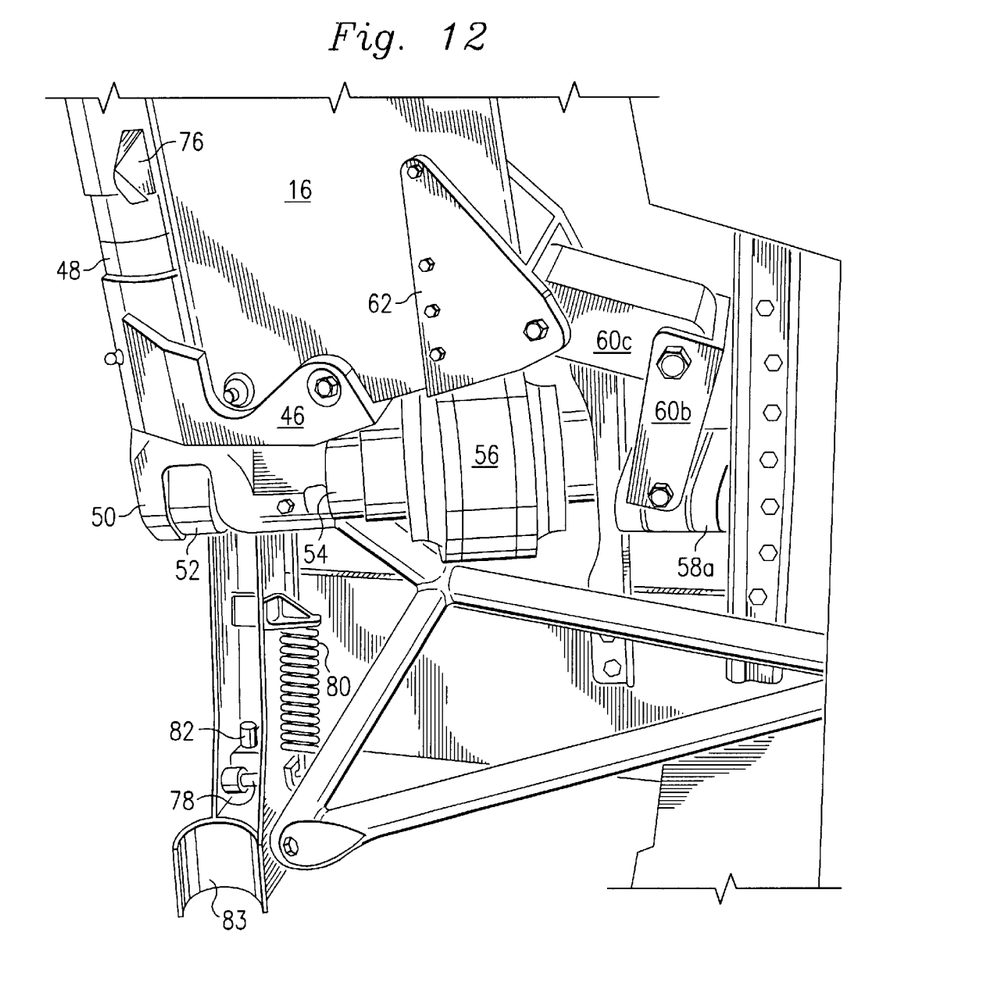
FIG. 12 is a broken away bottom perspective view of a catch for the deployed position.

Referring now to FIG. 12, the leg 16 has a hook 76 which cooperates with a deployment catch 78. The deployment catch 78 is releaseable, but acts to keep the leg 16 locked in the deployed position while engaged. The deployment catch 78 is biased by a spring 80, and a sensor means 82 is provided to confirm deployment of the leg 16. A cupped rest 83 is attached to the fuselage 30 and receives a portion of the first pivot member 48 when the leg 16 is in the deployed position. In one embodiment, the rest 83 is part of a billet that runs across the airplane 10'. In operation, a pilot or other control means determines whether the landing gear need be retracted or deployed. For moving from the deployed position of the landing gear 12 to the retracted position, the deployment catch 78 is released, the hydraulic rams 59 and 59'(FIG. 10) are activated by control means, causing the second pivot member 54, and hence leg 16, to rotate via the rack and pinion assembly 56. The leg assemblies 14 and 14' pass through the intermediate positions, rotating along the first pivot member 48 as well, eventually reaching a point where the leg 16 rests against the fuselage 30.

Figure 13:
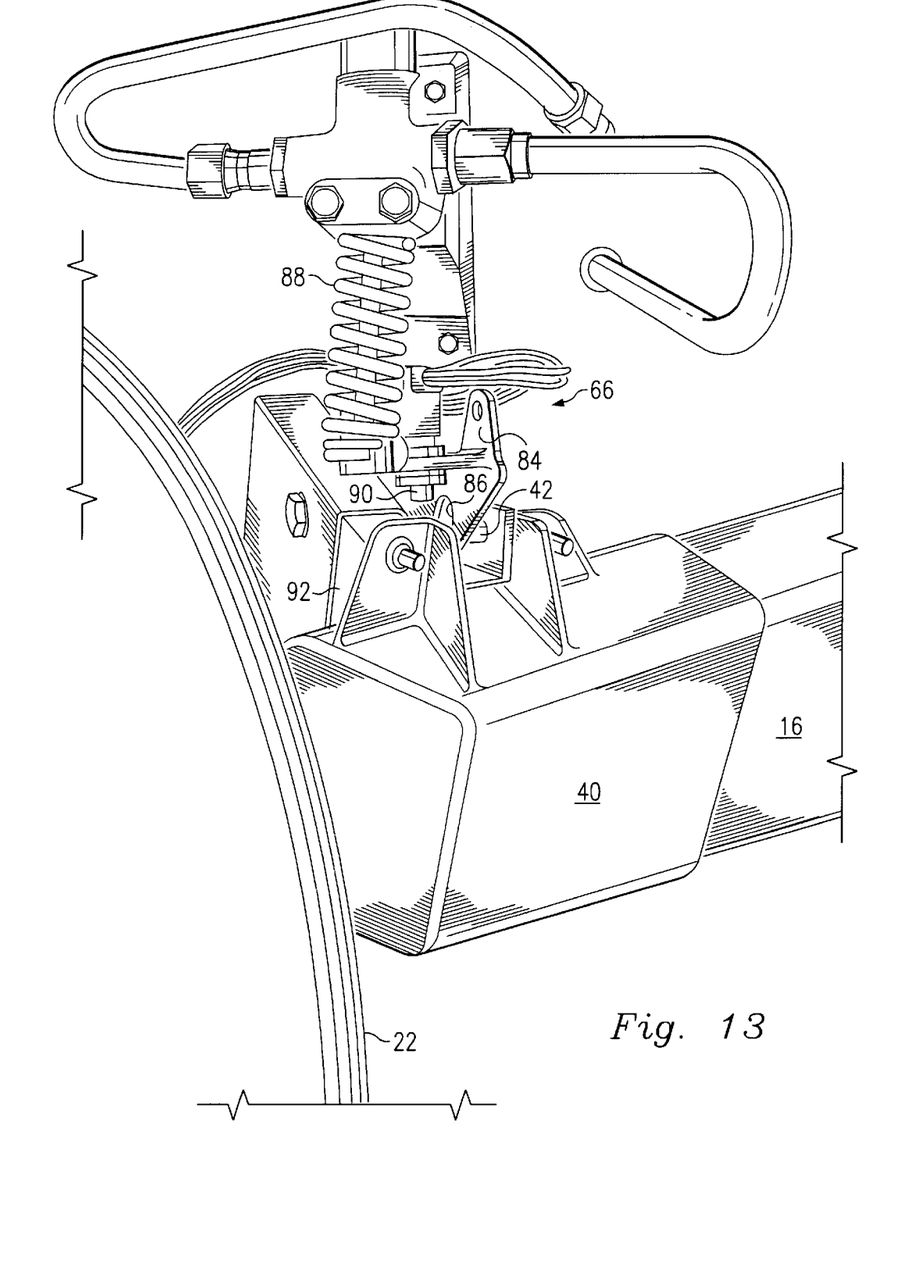
FIG. 13 is a broken away bottom perspective view of a catch for the retracted position.

Referring now to FIG. 13, the uplock assembly 66 captures the uplock roller 42 (FIG. 6) of the leg 16 to retain the leg in the retracted position. The uplock assembly comprises a retraction catch 84 having a slot 86 for engaging the uplock roller 42. The retraction catch 84 is releaseable, but acts to keep the leg 16 locked in the retracted position while engaged. The retraction catch 84 is biased by a spring 88, and a sensor means 90 is provided to confirm retraction of the leg 16. The leg 16 rests against a stop 92 in the retracted position.

For moving from the retracted position of the landing gear 12 to the deployed position, the retraction catch 84 (FIG. 13) is released, the hydraulic rams 59 and 59'(FIG. 10) are activated by control means, causing the second pivot member 54, and hence leg 16, to rotate via the rack and pinion assembly 56. The leg assemblies 14 and 14' pass through the intermediate positions, rotating along the first pivot member 48 as well, eventually reaching a point where the leg 16 rests against the rest 83. Simultaneously, the deployment catch 78 (FIG. 12) captures the hook 76 of the leg 16 to retain the leg in the deployed position.

One advantage of the previously described embodiments is that it teaches a retractable landing gear system that does not take up space in the airplane's cargo area, and reduces drag during retraction and deployment.

Another advantage of the previously described embodiments is that it is scalable to larger aircraft. For example, in prior systems for retractable landing gear for smaller aircraft, the wheels are retracted towards the rear of the plane into wheel wells within the fuselage of the plane. The wheel wells are located behind the last row of seats in the aircraft. This prior design would not scale well with increased aircraft size because the wheel wells would take up valuable passenger space in the cabin.

However, the present embodiment, with it's lateral displacement of the wheels below the fuselage, does not suffer from such problems. Elimination of wheel wells inside the fuselage preserves flat floor space in the interior of the aircraft for cargo and or passengers.

It is understood that all spatial references, such as vertical, horizontal, radial, and lateral are only for the purposes of explanation of the drawings. This disclosure shows and describes illustrative embodiments, however, the disclosure contemplates a wide range of modifications, changes, and substitutions. Such variations may employ only some features of the embodiments without departing from the scope of the underlying invention. Accordingly, any appropriate construction of the appended claims will reflect the broad scope of the underlying invention.

What is claimed is:

1. A landing gear system for an aircraft comprising:
   a pair of legs, each having a wheel at a distal end;
   a pivot point associated with each leg for allowing each leg to follow an arc-shaped path between a deployed position and a retracted position, one of the legs passing in front of the other while moving from the deployed position to the retracted position; and
   a linking assembly disposed between the legs for ensuring that the legs move from the deployed position to the retracted position in unison.

2. The system of claim 1 further comprising pods mounted to the aircraft for receiving the wheels in the retracted position.

3. The system of claim 1 further comprising a knuckle assembly attached to each leg to encourage each leg to follow the arc-shaped path between the deployed position and the retracted position.

4. The system of claim 1 wherein the linking assembly comprises:
   a first rack and pinion assembly attached to a first of the legs;
   a second rack and pinion assembly attached to a second of the legs;
   first and second rams for actuating the first and second rack and pinion assemblies;
   a first pivot arm attached to the first ram, and a second pivot arm attached to the second ram, each pivot arm turning on a pivot point, the first and second pivot arms being linked by a pair of guide arms to allow unison movement of the legs.

5. The system of claim 1 wherein the pivot point comprises:
   an extrusion; and
   first and second pivot members attached to each of the legs and pivotally mounted to the extrusion at a set of predetermined angles.

6. The system of claim 1 wherein the wheels extend below a fuselage of the aircraft in the retracted position.

7. The system of claim 1 further comprising a deployment catch associated with each leg to lock the leg in the deployed position.

8. The system of claim 1 further comprising an uplock assembly associated with each leg to retain the leg in the retracted position.

9. A method for retracting landing gear in an aircraft, comprising:
   providing a pair of identical spring legs;
   pivotally connecting the legs to the aircraft;
   rotating the legs in a plane transverse to the longitudinal axis of the aircraft, thereby moving the legs between a deployed position and a retracted position;
   passing one leg in front of the other, such that a wheel on a first side of the aircraft in the deployed position is on a second opposite side of the longitudinal axis of the aircraft in the retracted position, wherein the pair of identical spring legs are mounted on the aircraft such that a longitudinal axis of each leg is substantially perpendicular to the longitudinal axis of the aircraft at both the deployed and the retracted positions of the pair of identical spring legs.

10. The method of claim 9 further comprising linking the legs to allow them to move in unison.

11. A landing gear system for an aircraft comprising:
   a pair of anti-symmetrically oriented spring legs for moving between a deployed position and a retracted positions the retracted position of the wheel being located on the opposite side of the longitudinal axis of the aircraft from the deployed position, wherein the pair of anti-symmetrically oriented spring legs are mounted on the aircraft such that an longitudinal axis of each leg is substantially perpendicular to the longitudinal axis of the aircraft at both the deployed and the retracted positions of the pair of sprig legs; and
   means for passing one leg in front of the other while moving from the deployed position to the retracted position.

12. The system of claim 11 wherein each leg follows an arc-shaped path between the deployed position and the retracted position.

13. The system of claim 11 further comprising a linking assembly disposed between the legs for ensuring that the legs move from the deployed position to the retracted position in unison.

14. The system of claim 11 further comprising a knuckle assembly attached to each leg to encourage each leg to follow an arc-shaped path between the deployed position and the retracted position.

15. The system of claim 11 wherein the means for passing one leg in front of the other while moving from the deployed position to the retracted position is a pivot point mounted at a set of predetermined angles.

16. The system of claim 11 wherein the means for passing one leg in front of the other while moving from the deployed position to the retracted position comprises:

an extrusion; and first and second pivot members attached to each of the legs and pivotally mounted to the extrusion at a set of predetermined angles.

17. The system of claim 16 wherein the angles comprise:

an angle of approximately ninety seven and a half degrees between the first pivot member and the second pivot member along a plane defined by the leg; and an angle of approximately twenty five degrees between the second pivot member and a horizontal plane.

18. The system of claim 11 further comprising a deployment catch associated with each leg to lock the leg in the deployed position.

19. The system of claim 11 further comprising an uplock assembly associated with each leg to retain the leg in the retracted position.

* * * * *

UNITED STATES PATENT AND TRADEMARK OFFICE
CERTIFICATE OF CORRECTION

PATENT NO. : 6,464,168 B1
DATED : October 15, 2002
INVENTOR(S) : Graham Swannell et al.

It is certified that error appears in the above-identified patent and that said Letters Patent is hereby corrected as shown below:

Column 3,
Line 50, change "angle a" to -- angle α --.
Line 53, change "angle p" to -- angle β --.
Line 56, change "αand βcooperate" to -- α and β cooperate --.
Line 59, change "βis" to -- β is --.

Column 4,
Line 38, change "59'(FIG." to -- 59' (FIG. --.
Line 54, change "59'are" to -- 59' are --.

Column 5,
Lines 3 and 20, change "59'(FIG." to -- 59' (FIG. --.

Column 6,
Line 57, change "positions" to -- position, --.

Signed and Sealed this

Fifteenth Day of April, 2003

JAMES E. ROGAN
*Director of the United States Patent and Trademark Office*